United States Patent [19]

Brooker

[11] Patent Number: 5,570,921
[45] Date of Patent: Nov. 5, 1996

[54] FOLDAWAY PLASTIC CORRUGATED MOTOR VEHICLE CARRYING TOTE

[76] Inventor: Gregory A. Brooker, 6768 Robinson La., Saline, Mich. 48176

[21] Appl. No.: 449,255

[22] Filed: May 24, 1995

Related U.S. Application Data

[63] Continuation of Ser. No. 262,695, Jun. 20, 1994, abandoned.
[51] Int. Cl.$^6$ .................................................. B62D 33/02
[52] U.S. Cl. ......................... 296/39.1; 296/37.5; 224/542
[58] Field of Search ................................. 296/39.1, 39.2, 296/37.1, 37.5, 37.6; 224/314, 42.42; 105/423

[56] References Cited

U.S. PATENT DOCUMENTS

| | | | |
|---|---|---|---|
| 2,898,146 | 8/1959 | Yudenfreund | 296/39.1 |
| 2,911,253 | 11/1959 | Dewey | 296/39.1 |
| 4,279,439 | 7/1981 | Cantieri | 296/39.2 |
| 4,635,992 | 1/1987 | Hamilton et al. | 296/37.6 |
| 4,657,177 | 4/1987 | Karabedian | 229/137 |
| 4,691,859 | 9/1987 | Snyder | 229/23 R |
| 4,718,584 | 1/1988 | Schoeny | 224/42.42 |
| 4,884,733 | 12/1989 | Geeves | 224/311 |
| 4,890,874 | 1/1990 | Davis | 296/39.2 |
| 4,893,862 | 1/1990 | Hollenbaugh, Sr. | 296/39.1 |
| 4,911,296 | 3/1990 | Hart, Jr. | 224/42.42 X |
| 4,943,105 | 7/1990 | Kacar et al. | 296/39.1 X |
| 4,951,867 | 8/1990 | McManus | 229/120.31 |
| 5,025,964 | 6/1991 | Phirippidis | 224/42.42 |
| 5,031,769 | 7/1991 | Shea | 206/335 |
| 5,083,827 | 1/1992 | Hollenbaugh, Sr. | 296/37.1 |
| 5,110,171 | 5/1992 | Anthony | 296/39.2 |
| 5,161,700 | 11/1992 | Stannis et al. | 211/184 |
| 5,167,433 | 12/1992 | Ryan | 296/37.1 |
| 5,186,510 | 2/1993 | Stapp | 296/37.5 |
| 5,322,335 | 6/1994 | Niemi | 296/97.23 |

FOREIGN PATENT DOCUMENTS 103742  6/1984  Japan ................................ 296/39.1

OTHER PUBLICATIONS

L. L. Bean Catalog, "Bean's Heavy-Duty Cargo Area Liners", p. 33., (No Date).

Primary Examiner—Dean Kramer
Attorney, Agent, or Firm—Brinks Hofer Gilson & Lione

[57] ABSTRACT

An automobile foldable cargo liner which is preferably formed from a unitary blank of polymeric corrugated fiberboard material. The liner is formed to provide a rigid cover over the side and floor surface of the cargo area of an automobile to protect or prevent affecting the integrity of the automobile cargo area surface while providing an open top container for carrying cargo items. When not in use, the cargo liner can be folded over into a compact storage configuration. The cargo liner is also equipped with reinforced cut-out handles for ease of removing the liner, and its cargo, from the automobile or for ease of transporting and storing when folded for storage.

7 Claims, 2 Drawing Sheets

FOLDAWAY PLASTIC CORRUGATED MOTOR VEHICLE CARRYING TOTE

This application is a continuation of Ser. No. 08/262,695 filed Jun. 20, 1994, now abandoned.

BACKGROUND OF THE INVENTION

This invention relates generally to a foldable apparatus for lining the cargo area of an automobile and, in particular, to an improved, easily transportable, polymeric corrugated cargo container capable of protecting the automobile cargo area surface from items placed therein. The invention includes improved cut-out handles for ease in installation and removal from the automobile cargo area and for general transporting of the invention.

Vehicles, such as sport utility vehicles or passenger vans, for example, which provide areas for carrying cargo, are often equipped with foldable, slidable and/or removable rear passenger seats to provide a larger cargo compartment. In such vehicles, which are nicely upholstered throughout the cargo area, it is often desirable to provide a durable liner to shield and protect the interior bed and walls of the cargo compartment from the wear-and-tear of exposure to such cargo. It is also often desired to rapidly and easily remove and transport items from the cargo area of such vehicle. A lightweight foldable cargo liner which can be easily inserted into place and which sides can be unfolded to conform to a variably sized cargo area satisfies this purpose.

One known arrangement is shown in U.S. Pat. No. 5,167,433 issued to Patrick Ryan. This reference discloses the use of a single rigid member which conforms to a vehicle cargo area and is installed in compression contact with the vehicle cargo compartment. However, this type of cargo liner has limitations. Because the rigid liner does not fold, a storage space equal in size to the liner is often needed. A foldable liner, however, requires minimal storage space. Furthermore, a non-foldable rigid liner can be cumbersome for one person to transport and install.

SUMMARY OF THE INVENTION

It was to protect the vehicle cargo surface and to provide a convenient removal, transportation and storage of such cargo liner that the present inventor directed his attention.

The cargo liner is designed so that it allows folding of the liner in a variety of positions so that the liner may be fully open into a planar surface for easy cleaning, partially folded to provide a fitted cargo container, and fully folded into a compact carrying unit. In the partially folded position, the liner has a floor conforming generally to the shape of the vehicle cargo area, and integral rear, side and front walls, at least some of which generally conform to the walls of the vehicle cargo area. The rear, side and front walls include Velcro® or some similar adhesive to provide quick and easy securement of such walls in the folded positions.

Accordingly, it is an object of the present invention to provide a foldable rigid cargo liner of corrugated polymeric material which fits within the wheel wells of various sized vehicle cargo areas.

A further object of the present invention is to provide a vehicle cargo liner which, when removed from the vehicle, requires minimal storage space.

A still further object of the present invention is to provide a vehicle cargo liner which can easily be installed and removed from a vehicle cargo area by a single person.

Other objects, advantages and novel features of the present invention will become apparent in the following detailed description of the invention when considered in conjunction with the accompanying drawings.

DETAILED DESCRIPTION OF THE PREFERRED EMBODIMENT

Figure 1:
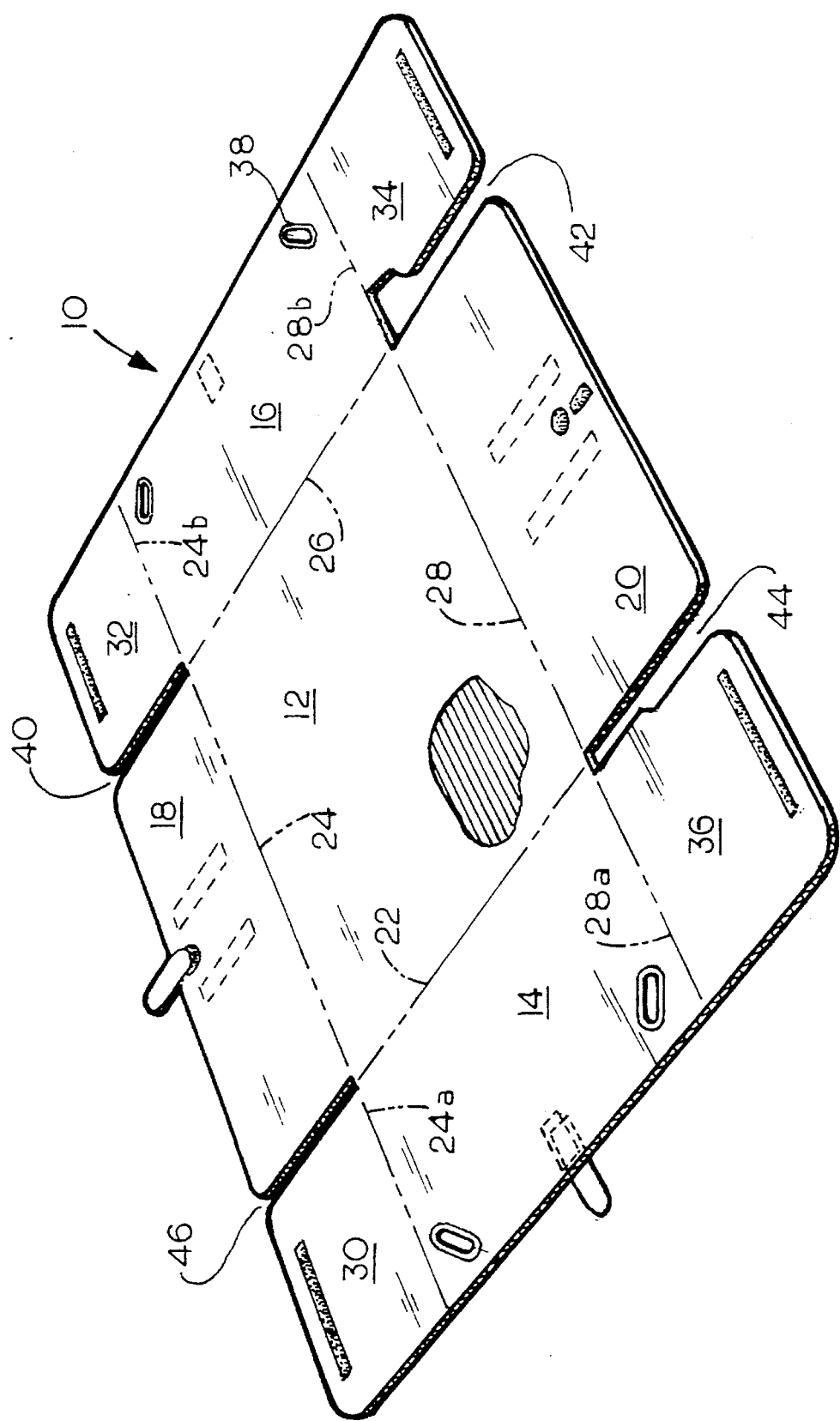
FIG. 1 is a perspective view showing the cargo liner in the fully open position.

Referring now to the drawings, attention is first directed to FIG. 1 which generally illustrates the preferred embodiments of a foldable cargo liner, according to the present invention, by reference numeral 10 in the fully open state. The liner is formed from a generally rectangular blank of corrugated polymeric material and includes a floor panel 12, and integral front, rear and side wall panels 18, 20, 14 and 16 respectively. The floor panel 12 is separated from the wall panels by fold lines 22, 24, 26 and 28. The fold lines, 22, 24, 26 and 28 are created by deforming the blank by scoring, bending or otherwise. The blank is also cut along extensions of fold lines 22 and 26 that lie beyond the floor panel 12 to form slots 44 and 46 at the ends of fold line 22, and slots 40 and 42 at the ends of fold line 26. The blank is also foldable along the extensions of fold lines 24 and 28 beyond the fold lines 22 and 26, as shown at 24a, 24b, 28a and 28b to form the corner locking flaps 30, 32, 34 and 36.

Figure 2:
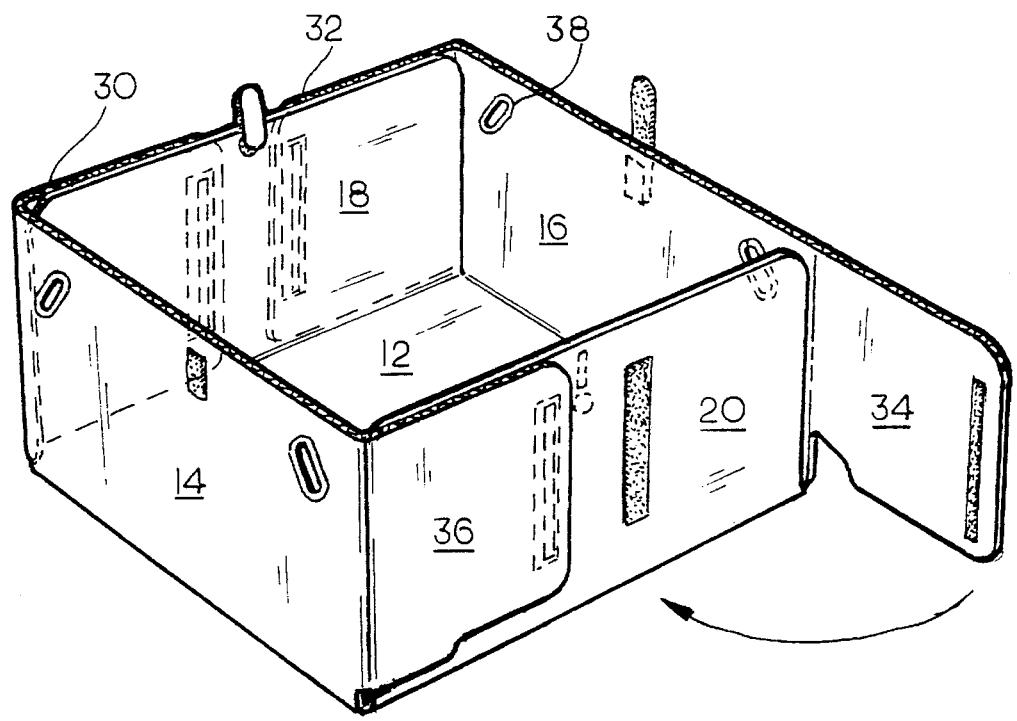
FIG. 2 is a perspective view of the cargo liner of FIG. 1 shown folded to form a container.

FIG. 2 illustrates the cargo liner 10 folded to form a container by inwardly folding the panels 14, 16, 18 and 20 along the fold lines 22, 24, 26 and 28 to extend normally with respect to the floor panel 12. The side wall panels 14 and 16 fit within the wheel wells of the cargo area and are held in place by inwardly folding the corner locking flaps 30, 32, 34 and 36 to overlie the end portions of the front panel 18 and the rear panel 20, and by securing the corner locking flaps to the adjacent front and rear panels by Velcro®, as shown, or by other forms of quick releasing means.

The cargo liner 10 may be assembled, as shown in FIG. 2, outside the vehicle and slid into the cargo compartment between the wheel wells, which generally extend into the bed of the vehicle cargo area, until the front panel 18 comes in contact with the back side of the rear passenger seat, when the rear seat is in the upright position. In the case where the rear seat is removed or adjusted to provide a larger cargo area, the corner locking flaps 30 and 32 can be unfolded to permit lowering of the front panel 18 to provide an extended cargo liner over the additional cargo area. Furthermore, rear panel 20 may be lowered by unfolding the corner locking flaps 34 and 36 to protect the tailgate or the rear bumper of the particular vehicle when loading or unloading the cargo liner.

Figure 3:
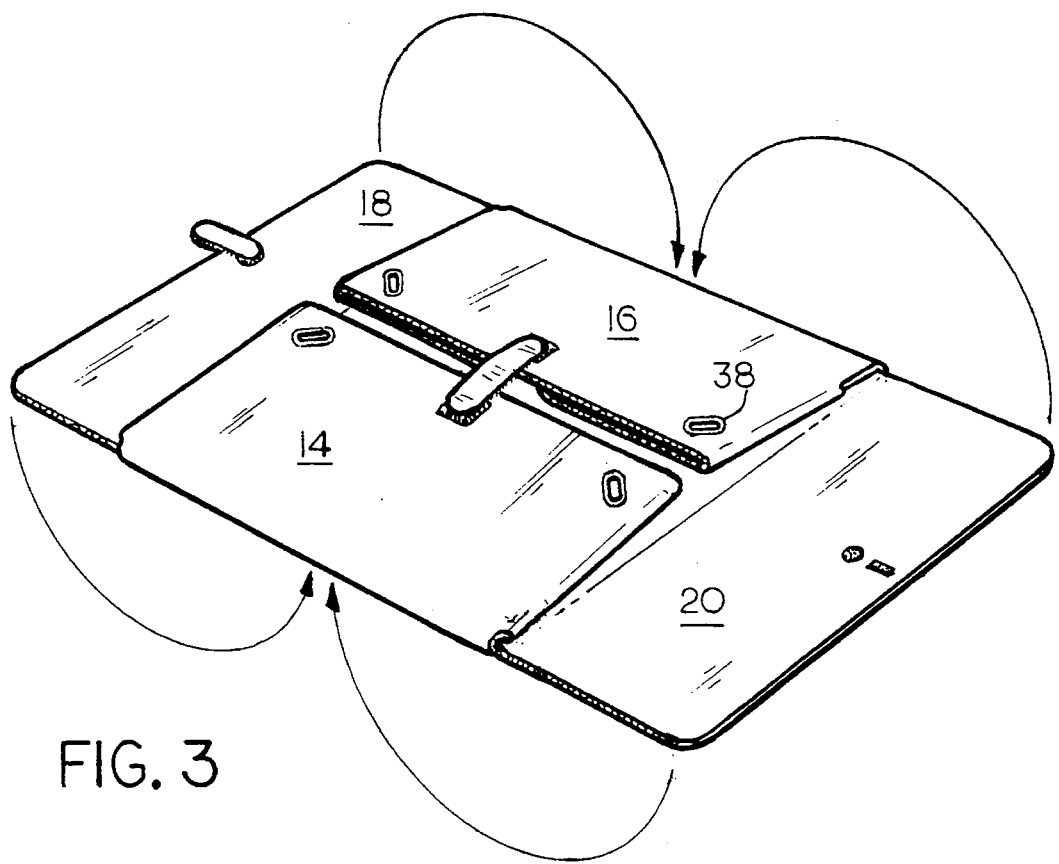
FIG. 3 is a perspective view of the cargo liner of FIGS. 1–2 shown fully folded for storage.

As can be seen in FIG. 3, the corner locking flaps 30 and 36, can be folded inwardly toward the end area of the side wall panel 14 so that the corner locking flaps 30 and 36, can be contained entirely within the outline of the floor panel 12 when the side wall panel 14 is folded inwardly toward the floor panel 12. Similarly, corner locking flaps 32 and 34 can be folded inwardly toward the end area of side wall panel 16 so that corner locking flaps 32 and 34 can be contained entirely within the outline of floor panel 12 when side wall panel 16 is folded inwardly toward floor panel 12. The front panel 18 and the rear panel 20 are folded along fold lines 24 and 28, as can be best seen in FIG. 3, to permit the cargo liner 10 to be folded in a neat, compact configuration for ease of storage and shipment of the cargo liner 10 when not in use. The cargo liner 10 is maintained in its compact configuration by means of Velcro® or like retaining devices extending between the front and rear panels, and the side wall panels. For optimum handling of the cargo liner 10, the side wall panels 14 and 16 are provided with reenforced hand grip cut-out slots 38.

The cargo liner 10 is preferably made of a sturdy, lightweight material such as a polymeric or elastomeric material or combination thereof. For example, some suitable materials could include polyethylene, high density polyethylene, polyethylene terephthalate, vinyl/polyvinyl chloride, polystyrene or polypropylene in a mono or multilayer composition. Of course it should be seen as an equivalent possibility to make the cargo liner 10 of a material having suitable strength and desired rigidity. Additionally, the outer surface of the blank of corrugated material may be coated with an anti-slip film of an elastomeric material to minimize shifting of the cargo stored within the cargo liner 10.

It is also preferred that the cargo liner material have a generally hollow corrugated cross-section or channel configuration. The cross-section needed to provide adequate support varies depending on the load to be transported within the cargo liner 10. For instance, it may be necessary to form the cargo liner 10 from a plurality of layers of corrugated, or channeled, material which have been joined together to prevent the panels from bowing out, and then die cut the cargo liner 10 to provide a desired shape. The innermost layer(s) may be scored along the fold lines 22 through 28b for ease of folding the cargo liner as described above.

A blank of such material may be cut to fit each particular vehicle cargo area. FIG. 1 illustrates extended notches 42 and 44 as an example of cut-outs which may be necessary to clear a particular vehicle upholstery molding strip. The blank of such material also includes a plurality of fastener means, such as, Velcro®, snaps or other similar means. Velcro® or some similar adhesive to affix the wall panels, as shown in the preferred embodiment, is generally quick and easy to use and permits the user to make minor adjustments for installation within the vehicle cargo area. Thus, in effect, cargo liner 10 can be expanded to adjust to the size of the vehicle cargo area. This permits mass production of identical cargo liners 10.

From the preceding description of the preferred embodiments, it is evident that the objects of the invention are attained by the present invention. Although this invention has been described and illustrated in detail, it is to be clearly understood the same is by way of illustration and example only and is not to be taken by way of limitation.

What is claimed:

1. A foldable, substantially rigid vehicle cargo liner comprising, in combination:

a generally rectangular floor panel having a front end edge, an opposite parallel rear end edge, and a pair of opposite parallel side end edges, said front, rear and side end edges defining an area generally corresponding to a cargo area of such vehicle;

a pair of opposed and spaced apart front and rear panels extending outwardly from said front and rear end edges of said floor panel, respectively;

a pair of opposed and spaced apart side panels extending outwardly from said side end edges of said floor panel, each side panel having a pair of opposite parallel corner support end edges, said front, rear and side panels being joined to said floor panel along a foldable crease along the front, rear and side end edges of said floor panel, respectively;

a laterally extending corner support panel extending outwardly from each corner support end edge of said side panels, said corner support panels being joined to said side panels along a foldable crease along said corner support end edges of said side panels; and means for releasably holding said front, rear, side and corner support panels, wherein said cargo liner is folded in an open position to form an open box when said side, front and rear panels are folded upwardly to extend at right angles to said floor panel, and then said corner support panels are folded to overlap only one side of said front and rear panels, and wherein said cargo liner is folded in a first flat position when said corner support panels are folded inwardly upon said side panels, then said side panels are folded inwardly upon said floor panel to overlie the same, and then said front and rear panels are folded inwardly upon said side panels to overlie the same, all such folded panels being generally parallel to said floor panel and overlying the area of said floor panel, and wherein said cargo liner is folded in a second flat position when said corner support panels are folded inwardly upon said side panels then said side panels are folded inwardly upon said floor panel to overlie the same, and then said front and rear panels are folded inwardly upon an opposite side of said floor panel to overlie the same, all such folded panels being generally parallel to said floor panel and overlie the area of said floor panel.

2. The vehicle cargo liner according to claim 1, wherein said corner support panels are releasingly held to said front and rear panels by said holding means when said cargo liner is folded in the open position.

3. The vehicle cargo liner according to claim 1, wherein at least one of said front, rear and side panels are releasingly held to each other by said holding means when said cargo liner is folded in the first flat position.

4. The vehicle cargo liner according to claim 1, wherein said front, rear and side panels are releasingly held to each other by said holding means when said cargo liner is folded in the second flat position.

5. A method of folding a vehicle cargo liner comprising a floor panel having an area generally corresponding to a cargo floor area of such vehicle, a front panel, a rear panel, a pair of side panels, each side panel having a pair of corner support panels, and a fastening means, the method comprising the steps of:

folding said corner support panels inwardly upon said side panels;

folding said side panels upon said floor panel to overlie the same; and folding said front and rear panels inwardly upon one of said floor panel and said side panels to overlie the same forming a first and second flat position, respectively, whereby all such folded panels are generally parallel to said floor panel and overlie the area of said floor panel.

6. The method according to claim 5, further comprising the step of fastening said side panels to each other using said fastening means.

7. The method according to claim 5, further comprising the step of fastening said front and rear panels to each other using said fastening means.

* * * * *